(12) United States Patent
Wang et al.

(10) Patent No.: US 11,893,708 B2
(45) Date of Patent: Feb. 6, 2024

(54) IMAGE PROCESSING METHOD AND APPARATUS, DEVICE, AND STORAGE MEDIUM

(71) Applicant: Beijing Baidu Netcom Science Technology Co., Ltd., Beijing (CN)

(72) Inventors: Jian Wang, Beijing (CN); Xiang Long, Beijing (CN); Hao Sun, Beijing (CN); Zhiyong Jin, Beijing (CN); Errui Ding, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 364 days.

(21) Appl. No.: 17/505,889

(22) Filed: Oct. 20, 2021

(65) Prior Publication Data

US 2022/0044358 A1 Feb. 10, 2022

(30) Foreign Application Priority Data

Jan. 20, 2021 (CN) .......................... 202110077536.3

(51) Int. Cl.
*G06K 9/00* (2022.01)
*G06T 3/40* (2006.01)
(Continued)

(52) U.S. Cl.
CPC .......... *G06T 3/4046* (2013.01); *G06F 18/213* (2023.01); *G06F 18/253* (2023.01); *G06N 3/045* (2023.01)

(58) Field of Classification Search
CPC ....... G06T 3/4046; G06T 1/20; G06F 18/213; G06F 18/253; G06F 18/24; G06N 3/045; G06N 3/08; G06V 10/82; G06V 30/18057
See application file for complete search history.

(56) References Cited

U.S. PATENT DOCUMENTS

2021/0019562 A1 1/2021 Yang et al.
2021/0241027 A1 8/2021 Hu et al.

FOREIGN PATENT DOCUMENTS

CN 110378976 A 10/2019
CN 110443842 A * 11/2019 ........... G06N 3/0454
(Continued)

OTHER PUBLICATIONS

Li et al., "An aerial image segmentation approach based on enhanced multi-scale convolutional neural network", 2019 IEEE International Conference on Industrial Cyber Physical Systems (ICPS), May 6, 2019, DOI:10.1109/ICPHYS.2019.8780187.
(Continued)

*Primary Examiner* — Xin Jia
(74) *Attorney, Agent, or Firm* — KDW Firm PLLC

(57) ABSTRACT

Provided are an image processing method and apparatus, a device, and a storage medium, relating to the technical field of image processing, in particular to the artificial intelligence fields such as computer vision and deep learning. The specific implementation scheme is as follows: inputting a to-be-processed image into an encoding network to obtain a basic image feature, wherein the encoding network includes at least two cascaded overlapping encoding sub-networks which perform encoding and fusion processing on input data at at least two resolutions; and inputting the basic image feature into a decoding network to obtain a target image feature for pixel point classification, wherein the decoding network includes at least one cascaded overlapping decoding sub-network to perform decoding and fusion processing on input data at at least two resolutions respectively.

19 Claims, 5 Drawing Sheets

(51) Int. Cl.
G06F 18/213 (2023.01)
G06F 18/25 (2023.01)
G06N 3/045 (2023.01)

(56) References Cited

FOREIGN PATENT DOCUMENTS

| | | | | |
|---|---|---|---|---|
| CN | 110458939 A | * | 11/2019 | ........... G06N 3/0454 |
| CN | 110570350 A | * | 12/2019 | ........... G06N 3/0454 |
| CN | 110599492 A | * | 12/2019 | |
| CN | 107346436 B | * | 3/2020 | ........... G06K 9/6267 |
| CN | 111798462 A | | 10/2020 | |
| WO | 2020108525 A1 | | 4/2020 | |

OTHER PUBLICATIONS

Extended European Search Report for European Application No. 21207470.2, dated Apr. 8, 2022, 25 pages.

* cited by examiner

IMAGE PROCESSING METHOD AND APPARATUS, DEVICE, AND STORAGE MEDIUM

CROSS-REFERENCE TO RELATED APPLICATION

This application claims the priority to Chinese Patent Application No. CN202110077536.3, filed on Jan. 20, 2021 and entitled "IMAGE PROCESSING METHOD AND APPARATUS, DEVICE, AND STORAGE MEDIUM", the disclosure of which is incorporated herein by reference in its entirety.

TECHNICAL FIELD

The present application relates to the technical field of image processing, in particular, to the artificial intelligence fields such as computer vision and deep learning.

BACKGROUND

Dense prediction is a kind of image processing task based on dense pixels and specifically is to classify every pixel point in the whole to-be-processed image to achieve semantic segmentation, boundary prediction, image restoration or image positioning.

For the problem of dense prediction, in the related art, there is a problem that the semantic expression ability of extracted features is poor when the feature extraction is performed on the to-be-processed image, which seriously affects the accuracy of dense prediction results.

SUMMARY

The present application provides an image processing method and apparatus, a device, and a storage medium.

According to an aspect of the present application, an image processing method is provided. The method includes the steps described below.

A to-be-processed image is inputted into an encoding network to obtain a basic image feature, where the encoding network includes at least two cascaded overlapping encoding sub-networks, each overlapping encoding sub-network performs encoding and fusion processing on input data of the each overlapping encoding sub-network at at least two resolutions.

The basic image feature is inputted into a decoding network to obtain a target image feature for pixel point classification, where the decoding network includes at least one cascaded overlapping decoding sub-network, each overlapping decoding sub-network performs decoding and fusion processing on input data of the each overlapping decoding sub-network at at least two resolutions respectively.

According to another aspect of the present application, an image processing apparatus is provided. The apparatus includes a processor and a memory for storing execution instructions that when executed by the processor cause the processor to perform steps in a basic image feature obtaining module and a target image feature obtaining module.

The basic image feature obtaining module is configured to input a to-be-processed image into an encoding network to obtain a basic image feature, where the encoding network includes at least two cascaded overlapping encoding sub-networks, each overlapping encoding sub-network performs encoding and fusion processing on input data of the each overlapping encoding sub-network at at least two resolutions.

The target image feature obtaining module is configured to input the basic image feature into a decoding network to obtain a target image feature for pixel point classification, where the decoding network includes at least one cascaded overlapping decoding sub-network, each overlapping decoding sub-network perform decoding and fusion on input data of the each overlapping decoding sub-network at at least two resolutions.

According to another aspect of the present application, a non-transitory computer-readable storage medium is provided. The non-transitory computer-readable storage medium has computer instructions stored thereon, where the computer instructions are configured to cause a computer to perform any one of the image processing methods provided in the embodiments of the present application.

It is to be understood that the content described in this part is neither intended to identify key or important features of embodiments of the present application nor intended to limit the scope of the present application. Other features of the present application are apparent from the description provided hereinafter.

BRIEF DESCRIPTION OF DRAWINGS

The drawings are intended to provide a better understanding of the solution of the present application and not to limit the present application. In the drawings.

DETAILED DESCRIPTION

Example embodiments of the present application, including details of embodiments of the present application, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

The image processing methods and the image processing apparatuses provided by embodiments of the present application are applicable to the case of performing image feature extraction on to-be-processed images based on artificial intelligence technologies such as deep learning when the dense prediction problem is to be solved. Each of the image processing methods provided by the present application may be executed by an image processing apparatus which is implemented by software and/or hardware and is specifically disposed in an electronic device.

Figure 1:
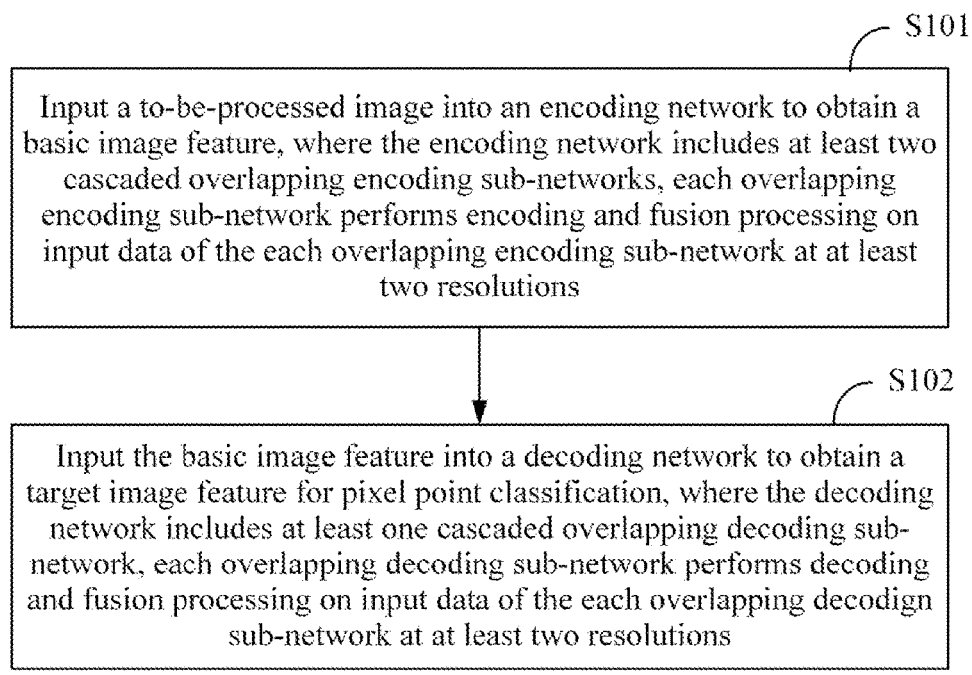
FIG. 1 is a flowchart of an image processing method according to an embodiment of the present application.

With reference to FIG. 1, an image processing method is illustrated. The method includes the steps described below.

In S101, a to-be-processed image is inputted into an encoding network to obtain a basic image feature, where the encoding network includes at least two cascaded overlapping encoding sub-networks. Each overlapping encoding sub-network performs encoding and fusion processing on input data of the each overlapping encoding sub-network at at least two resolutions.

In S102, the basic image feature is inputted into a decoding network to obtain a target image feature for pixel point classification, where the decoding network includes at least one cascaded overlapping decoding sub-network. Each overlapping decoding sub-network performs decoding and fusion processing on input data of the each overlapping decoding sub-network at at least two resolutions.

In order to facilitate the understanding, with reference to FIG. 2 which shows a structure diagram of a feature extraction network, the generation process of the basic image feature and the target image feature will be described in detail.

Figure 2:
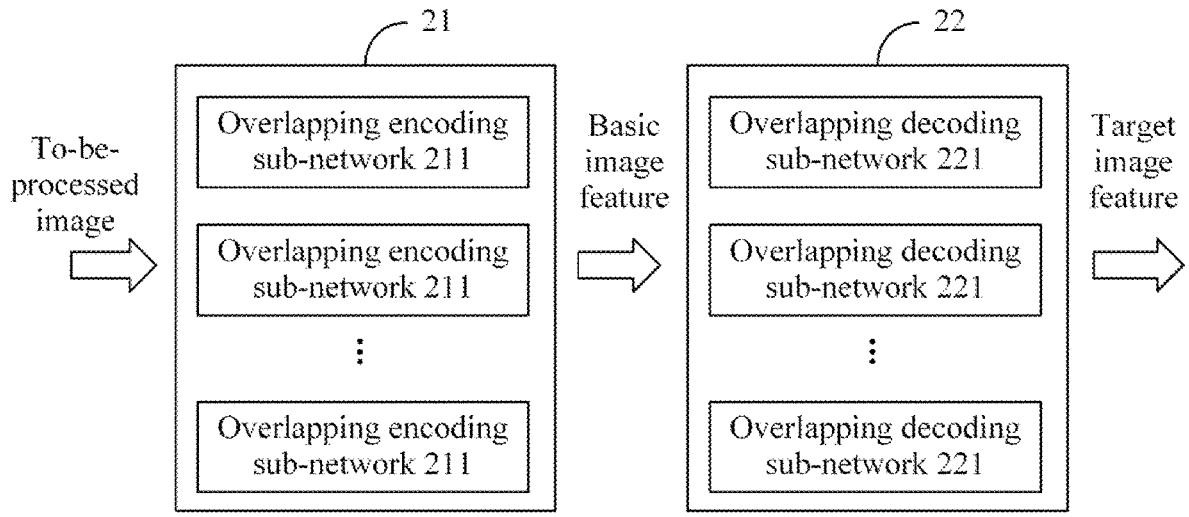
FIG. 2 is a structure diagram of a feature extraction network according to an embodiment of the present application.

As shown in FIG. 2, the feature extraction model includes an encoding network 21 and a decoding network 22. The encoding network 21 includes at least two cascaded overlapping encoding sub-networks 211, and the decoding network 22 includes at least two cascaded overlapping decoding sub-networks 221. Each overlapping encoding sub-network 211 is configured to perform encoding and fusion processing on input data of the each overlapping encoding sub-network at at least two resolutions to implement the feature extraction of the input data of the each overlapping encoding sub-network. Each overlapping decoding sub-network 221 is configured to perform decoding and fusion processing on input data of the each overlapping decoding sub-network at at least two resolutions to implement the feature reconstruction of the input data of the each overlapping decoding sub-network.

When the overlapping encoding sub-network 211 performs encoding processing on input data at at least two resolutions, the overlapping encoding sub-network 211 may first adjust the resolution of the input data to obtain input data of at least two different resolutions; separately perform encoding processing on the input data of at least two resolutions to extract output data of at least two receptive fields; and perform feature fusion on the output data of at least two receptive fields, thereby improving the richness and comprehensiveness of semantic information contained in the encoding result.

When the overlapping decoding sub-network 221 performs decoding processing on input data at at least two resolutions, the overlapping decoding sub-network 221 may first adjust the resolution of the input data to obtain input data of at least two different resolutions; separately perform decoding processing on the input data of at least two resolutions to obtain reconstruction data of at least two scales; and perform feature fusion on the reconstruction data of at least two scales, thereby improving the richness and comprehensiveness of semantic information contained in the decoding result.

The number of overlapping encoding sub-networks 211 in the encoding network 21 may be determined by technicians according to requirements or empirical values, or repeatedly determined by performing a large number of trials. The number of overlapping decoding sub-networks 221 in the decoding network 22 may be determined by technicians according to requirements or empirical values or repeatedly determined by performing a large number of trials. The number of overlapping encoding sub-networks 211 and the number of overlapping decoding sub-networks 221 may be the same or different.

The basic image feature includes context information in the to-be-processed image, which is used for characterizing a global feature of the to-be-processed image. For example, the basic image feature may be determined from at least one of multiple data with the lowest resolution among the output data of each of the overlapping encoding sub-networks 211 in the encoding network 21.

It is to be noted that in the process of decoding processing, at least one cascaded overlapping decoding sub-network 221 in the decoding network 22 performs decoding and fusion on the basic image feature at different scales stepwise so that local detail information is continuously superimposed on the basis of the basic image feature, which causes the semantic information carried by the final generated target image feature to be rich and comprehensive, thereby improving the semantic expression ability of target image features.

In order to facilitate subsequent use, the resolution of the target image feature is usually the same as the resolution of the to-b-processed image. For example, the target image feature may be used for dense prediction on the to-be-processed image, that is, each pixel point in the to-be-processed image is classified according to the target image feature, thereby providing data reference for the implementation of image semantic segmentation, boundary prediction, image restoration or image positioning.

In the embodiment of the present application, at least one cascaded overlapping decoding sub-network is arranged in the decoding network to perform encoding and fusion processing on the basic image feature at different scales stepwise. The number of overlapping decoding sub-networks is set to at least one so that the inference times in the generation process of the target image feature increase. In this way, on the basis of the basic image feature, local detail features are superposed at different scales, which causes the semantic information carried by the final generated target image feature to be rich and comprehensive, thereby improving the semantic expression ability of the target image features and laying a foundation for the improvement of the accuracy of pixel point classification results, that is, improving the accuracy of dense prediction results.

In order to implement the reuse of the existing High-Resolution Network (HRNet), the input data of a head overlapping encoding sub-network in the encoding network may be set as the to-be-processed image so that feature encoding is performed on the to-be-processed image only through the head overlapping encoding sub-network. However, the input data of each of non-head overlapping encoding sub-networks in the encoding network may be determined according to the output data of a previous overlapping encoding sub-network of each of the non-head overlapping encoding sub-networks, and resolutions of the pieces of input data sequentially decrease, so as to achieve the purpose of performing feature encoding and feature fusion on the pieces of input data at different resolutions.

For example, for each non-head overlapping encoding sub-network, pieces of data of at least two resolutions may be generated according to output data of a previous overlapping encoding sub-network of a non-head overlapping encoding sub-network, and the generated data may be used as the input data of the non-head overlapping encoding sub-network.

In a specific implementation, downsampling may be performed on the previous overlapping encoding sub-network according to a set downsampling frequency at least once to generate at least one downsampling result; and at least two of the output data of the previous overlapping encoding sub-network and the at least one downsampling result are used as the input data of the non-head overlapping encoding sub-network. The value of the set downsampling frequency may be determined by technicians according to requirements or empirical values or repeatedly determined by performing a large number of trials.

In order to ensure that different overlapping encoding sub-networks can extract information of different scales and increase receptive fields in the feature extraction process, the resolutions of the pieces of input data of non-head overlapping encoding sub-networks sequentially decrease.

It is to be noted that in order to ensure that each non-head overlapping encoding sub-network can implement the encoding and fusion processing at at least two resolutions, the amount of input data of the overlapping encoding sub-network is usually set to at least two. It is to be noted that the amount of input data in each non-head overlapping encoding sub-network is not limited in the present application, and those skilled in the art can set or adjust the specific amount according to the actual requirements. Of course, the amount of input data in different overlapping encoding sub-networks may be the same or different. Generally, in order to simplify the building logic of the encoding network, the amount of input data of non-head overlapping encoding sub-networks is usually set to be the same. Accordingly, the model structure of each non-head overlapping encoding sub-network is set to the same or similar structure.

Figure 3:
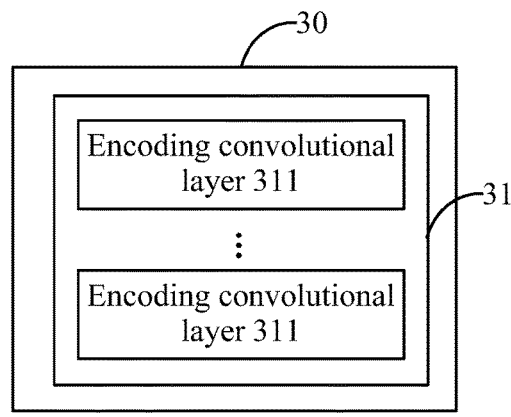
FIG. 3 is a structure diagram of an overlapping encoding sub-network according to an embodiment of the present application.

In order to further improve the model structure of the overlapping encoding sub-network, with reference to FIG. 3 which shows a structure diagram of an overlapping encoding sub-network, the specific structure of the overlapping encoding sub-network will be described in detail.

The non-head overlapping encoding sub-network 31 in the encoding network 30 includes at least two encoding convolutional layers 311, and the resolution of input data of the at least two encoding convolutional layers 311 is different from each other.

In a specific implementation, downsampling may be performed on the output data of a previous overlapping encoding sub-network according to a set downsampling frequency at least once to generate at least one downsampling result; and at least two of the output data of the previous overlapping encoding sub-network and the at least one downsampling result, which have different resolutions, are used as the input data of each encoding convolutional layer 311 in a non-head overlapping encoding sub-network 31. The value of the set downsampling frequency may be determined by technicians according to requirements or empirical values or repeatedly determined by performing a large number of trials.

It is to be noted that when downsampling is performed at least twice in the same overlapping encoding sub-network, the set downsampling frequencies may be the same or different; when downsampling is performed in different overlapping encoding sub-networks, the set downsampling frequencies may also be the same or different.

It is to be noted that the number of encoding convolutional layers contained in different non-head overlapping encoding sub-networks may be the same or different as long as it is ensured that each overlapping encoding sub-network has the ability to process input data of at least two resolutions. Moreover, in order to simplify the building logic of the overlapping encoding sub-network, the number of encoding convolutional layers in each overlapping encoding sub-network is usually set to be the same.

It is to be understood that at least two encoding convolutional layers are set in each non-head overlapping encoding sub-network, and the resolution of input data of each encoding convolutional layer is distinguished, so that each non-head overlapping encoding sub-network has the multi-resolution encoding processing ability.

In an optional embodiment, in order to improve the feature encoding efficiency, each encoding convolutional layer in the non-head overlapping encoding sub-network may perform encoding processing on the input data in parallel.

For each non-head overlapping encoding sub-network in the encoding network, each encoding convolutional layer is configured to perform feature extraction and feature fusion on input data to implement encoding and fusion on the input data.

In a specific implementation, each of the at least two encoding convolutional layers performs feature extraction on input data of the each of the at least two encoding convolutional layers to obtain an encoding feature; and for each of the at least two encoding convolutional layers, an encoding convolutional layer adjusts encoding features outputted by other encoding convolutional layers to obtain an adjustment result and performs feature fusion on the adjustment result and the encoding feature outputted by the encoding convolutional layer to obtain output data of the encoding convolutional layer, where the encoding convolutional layer and the other encoding convolutional layers belong to a same overlapping encoding sub-network.

Specifically, each encoding convolutional layer separately performs feature extraction on input data of the each encoding convolutional layer to obtain a corresponding encoding feature. Since the resolutions of pieces of input data corresponding to different encoding convolutional layers are different, the receptive fields for feature extraction are different, accordingly, the resolutions of the extracted encoding features are also different, and the pieces of semantic information carried by the encoding features are also different. For each encoding convolutional layer, the encoding convolutional layer adjusts the encoding features outputted by other encoding convolutional layers to obtain an adjustment result, so that the resolution of the adjustment result is consistent with the resolution of the encoding feature outputted by the encoding convolutional layer, which lays a foundation for the smooth execution of feature fusion, where encoding convolutional layer and the other encoding convolutional layers belong to a same overlapping encoding sub-network. Accordingly, feature fusion is performed on the adjustment result and the encoding feature outputted by the encoding convolutional layer so that the output data of the overlapping encoding sub-network can carry semantic information of different dimensions, thereby improving the semantic richness and comprehensiveness of the output data of the overlapping encoding sub-network.

For a non-tail overlapping encoding sub-network, output data of the non-tail overlapping encoding sub-network is used as reference data for input data of a next overlapping encoding sub-network to determine the input data of the next overlapping encoding sub-network. For the tail overlapping encoding sub-network, output data of the tail overlapping encoding sub-network is used for determining the basic image feature, and input data of the decoding network is generated according to the basic image feature.

It is to be noted that the number of encoding convolutional layers in the non-head overlapping encoding sub-network is at least two. In addition, in the field of deep learning, convolution processing is usually used to implement the operation of feature extraction and feature fusion. Therefore, each encoding convolutional layer includes at least one convolutional unit for implementing feature extraction function and at least one convolution unit for implementing feature fusion.

In order to simplify the network structure of the encoding network and thus reduce the network complexity, in an optional embodiment, the number of encoding convolutional layers in the non-head overlapping encoding sub-network may be set to two, and the number of convolution units contained in each encoding convolutional layer is two.

Figure 4:
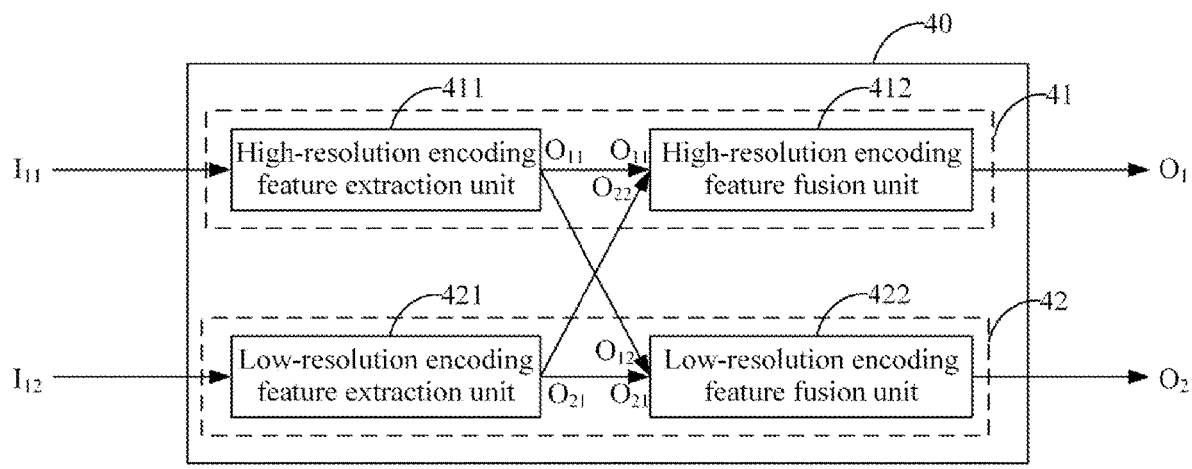
FIG. 4 is a structure diagram of another overlapping encoding sub-network according to an embodiment of the present application.

Further, with reference to FIG. 4 which shows a structure diagram of a non-head overlapping encoding sub-network, the overlapping encoding sub-network 40 includes a high-resolution encoding convolutional layer 41 and a low-resolution encoding convolutional layer 42. The high-resolution encoding convolutional layer 41 includes a high-resolution encoding feature extraction unit 411 and a high-resolution encoding feature fusion unit 412, and the low-resolution encoding convolutional layer 42 includes a low-resolution encoding feature extraction unit 421 and a low-resolution encoding feature fusion unit 422.

The high-resolution encoding feature extraction unit 411 performs feature extraction on input data $I_{11}$ of the high-resolution encoding feature extraction unit 411 to obtain a high-resolution encoding feature $O_{11}$. The low-resolution encoding feature extraction unit 421 performs feature extraction on input data $I_{12}$ of the low-resolution encoding feature extraction unit 421 to obtain a low-resolution encoding feature $O_{21}$. The high-resolution encoding feature fusion unit 412 performs feature fusion on the high-resolution encoding feature $O_{11}$ and an upsampling result $O_{22}$ corresponding to the low-resolution encoding feature $O_{21}$ to obtain output data $O_1$ of the high-resolution encoding feature fusion unit 412, where the upsampling result $O_{22}$ has the same resolution as the high-resolution encoding feature $O_{11}$. The low-resolution encoding feature fusion unit 422 performs feature fusion on the low-resolution encoding feature $O_{21}$ and a downsampling result $O_{12}$ corresponding to the high-resolution encoding feature $O_{11}$ to obtain output data $O_2$ of the low-resolution encoding feature fusion unit 422, where the downsampling result $O_{12}$ has the same resolution as the low-resolution encoding feature $O_{21}$.

The resolutions of the output data $O_1$ and the output data $O_2$ are different from each other. Specifically, the resolution of the output data $O_1$ is higher than the resolution of the output data $O_2$.

For example, the downsampling process may be implemented by means of max pooling, average pooling or stride convolution, which is not limited in the present application. Because of the information loss in the downsampling process, the stride convolution is typically used to reduce the information loss through learning.

For example, the upsampling process may be implemented by means of transposed convolution or interpolation to implement channel dimension consistency. The interpolation may be bilinear interpolation or other interpolation methods in the related art, which is not limited in the present application.

For example, the feature fusion may be implemented by means of pixel point superimposition, and of course, the feature fusion may be implemented in other methods in the related art as needed, which is not limited in the present application.

If the overlapping encoding sub-network 40 is followed by a next overlapping encoding sub-network, downsampling may be directly performed on the output data $O_1$ and the output data $O_2$ respectively to obtain data of at least two different resolutions as input data of the next overlapping encoding sub-network; or optionally, downsampling may be performed on the output data $O_2$ to obtain at least two downsampling results, and at least two pieces of data, of different resolutions, of the downsampling results and the output data $O_2$ may be used as input data of the next overlapping encoding sub-network; or optionally, downsampling may be performed on the output data $O_1$ to obtain at least two downsampling results, and at least two pieces of data of at least two different resolutions in the downsampling results may be used as input data of the next overlapping encoding sub-network.

If the overlapping encoding sub-network 40 is not followed by a next overlapping encoding sub-network, the basic image feature may be generated directly according to at least one of the output data $O_1$ and the output data $O_2$. The number of basic image features may be at least one.

In a specific implementation, the basic image feature is generated according to at least one of the output data $O_1$ and the output data $O_2$ by using at least one of the following manners: the output data $O_1$ is directly used as the basic image feature, the output data $O_2$ is directly used as the basic image feature, the fusion feature of the output data $O_1$ and the output data $O_2$ is used as the basic image feature, or the upsampling result of the output data $O_1$ or the upsampling result of the output data $O_2$ is used as the basic image feature.

It is to be understood that the specific structure of the non-head overlapping encoding subnetwork is refined into a high-resolution encoding feature extraction unit, a high-resolution encoding feature fusion unit, a low-resolution encoding feature extraction unit, and a low-resolution encoding feature fusion unit. Each of the units performs its own functions to implement feature extraction and feature fusion, thereby further improving the encoding mechanism of the encoding network. Meanwhile, only two encoding convolutional layers are arranged in the embodiment of the present application, that is, the high-resolution encoding convolutional layer and the low-resolution encoding convolutional layer, thereby reducing the network complexity of the encoding network and improving the encoding efficiency.

The above-mentioned optional embodiments describe in detail the encoding network at different levels. The related contents of the decoding network will be described in detail below.

In an optional embodiment, input data of a head overlapping decoding sub-network in the decoding network is determined according to output data of a tail overlapping encoding sub-network in the encoding network. For example, resolution adjustment may be performed directly on the basic image feature to obtain an adjustment result, and at least two data of two resolutions in the adjustment result and the basic image feature are used as input data of a head overlapping decoding sub-network in the decoding network. The input data of a non-head overlapping decoding sub-network in the decoding network is determined according to output data of a previous overlapping decoding sub-network, and the resolutions of the pieces of input data sequentially increase, thereby achieving the purpose of feature decoding and feature fusion on the input data at different resolutions.

For example, for each non-head overlapping decoding sub-network, data of at least two resolutions may be generated according to output data of a previous overlapping decoding sub-network of a non-head overlapping decoding sub-network, and the generated data may be used as the input data of the non-head overlapping decoding sub-network.

In a specific implementation, upsampling may be performed on the previous overlapping decoding sub-network according to a set upsampling frequency at least once to generate at least one upsampling result; and at least two of the output data of the previous overlapping decoding sub-network and the at least one upsampling result are used as the input data of the non-head overlapping decoding sub-network. The value of the set upsampling frequency may be determined by technicians according to requirements or empirical values or repeatedly determined by performing a large number of trials. The value of the set upsampling frequency may be the same as or different from the value of the preceding set downsampling frequency. In order to ensure the symmetry between the decoding process and the encoding process and thus simplify the model results and reduce the model complexity, it is typical to set the values of the set upsampling frequency and the set downsampling frequency to be the same.

In order to ensure that different overlapping decoding sub-networks can obtain information of different scales through decoding, the resolutions of the pieces of input data of overlapping decoding sub-networks sequentially increase.

For example, in order to correspond the decoding process to the encoding process, the tail overlapping decoding sub-network in the decoding network may be configured to perform feature decoding only on the input data without performing feature fusion at different resolutions.

It is to be noted that in order to ensure that each non-tail overlapping decoding sub-network can implement the decoding and fusion processing at at least two resolutions, the amount of input data of the overlapping decoding sub-network is usually set to at least two. It is to be noted that the amount of input data in each non-tail overlapping decoding sub-network is not limited in the present application, and those skilled in the art can set or adjust the specific amount according to the actual requirements. Of course, the amount of input data in different overlapping decoding sub-networks may be the same or different. Generally, in order to simplify the building logic of the decoding network, the amount of input data of non-tail overlapping encoding sub-networks is usually set to be the same. Accordingly, the model structure of each non-tail overlapping decoding sub-network is set to be the same or similar structure.

Figure 5:
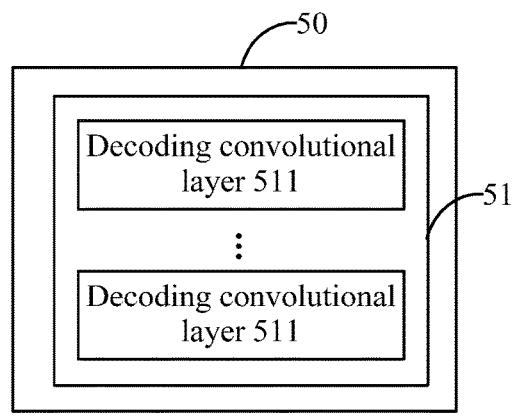
FIG. 5 is a structure diagram of an overlapping decoding sub-network according to an embodiment of the present application.

In order to further improve the model structure of the overlapping decoding sub-network, with reference to FIG. 5 which shows a structure diagram of an overlapping decoding sub-network, the specific structure of the overlapping decoding sub-network will be described in detail.

The non-tail overlapping decoding sub-network S1 in the decoding network 50 includes at least two decoding convolutional layers 511, and the resolution of input data of the at least two decoding convolutional layers 511 is different from each other.

In a specific implementation, for the head overlapping decoding sub-network, upsampling may be performed on the output data of a previous overlapping decoding sub-network according to a set upsampling frequency at least once to generate at least one upsampling result; and data of at least two different resolutions in the output data of the previous overlapping decoding sub-network and the at least one upsampling result are used as the input data of each decoding convolutional layer 511 in the head overlapping decoding sub-network 51. The value of the set upsampling frequency may be determined by technicians according to requirements or empirical values or repeatedly determined by performing a large number of trials.

In another specific implementation, for an overlapping decoding sub-network which is not at the head or tail, upsampling may be performed on the output data of a previous overlapping decoding sub-network according to a set upsampling frequency at least once to generate at least one upsampling result; and data of at least two different resolutions in the output data of the previous overlapping decoding sub-network and the at least one upsampling result are used as the input data of each decoding convolutional layer in the overlapping decoding sub-network. The value of the set upsampling frequency may be determined by technicians according to requirements or empirical values or repeatedly determined by performing a large number of trials.

It is to be noted that when upsampling is performed at least twice in the same overlapping decoding sub-network, the set upsampling frequencies may be the same or different; when upsampling is performed in different overlapping decoding sub-networks, the set upsampling frequencies may also be the same or different.

It is to be noted that the number of decoding convolutional layers contained in different non-tail overlapping decoding sub-networks may be the same or different as long as it is ensured that each overlapping decoding sub-network has the ability to process input data of at least two resolutions. Of course, in order to simplify the building logic of the overlapping decoding sub-network, the number of decoding convolutional layers in each overlapping decoding sub-network is usually set to be the same.

It is to be understood that at least two decoding convolutional layers are set in each non-tail overlapping decoding sub-network, and the resolution of input data of each decoding convolutional layer is distinguished, so that each non-tail overlapping decoding sub-network has the multi-resolution decoding processing ability.

In an optional embodiment, in order to improve the feature decoding efficiency, each decoding convolutional layer in the non-tail overlapping decoding sub-network may perform decoding processing on the input data in parallel.

For each non-tail overlapping decoding sub-network in the decoding network, each decoding convolutional layer is configured to perform the operation of feature reconstruction and feature fusion on input data to implement decoding and fusion on the input data.

In a specific implementation, each of the at least two decoding convolutional layers performs feature reconstruction on input data of the each of the at least two decoding convolutional layers to obtain a decoding feature; and for each of the at least two decoding convolutional layers, a decoding convolutional layer adjusts decoding features outputted by other decoding convolutional layers to obtain an adjustment result and performs feature fusion on the adjustment result and a decoding feature outputted by the decoding convolutional layer to obtain output data of the decoding convolutional layer, where the decoding convolutional layer and the other decoding convolutional layers belong to a same overlapping decoding sub-network.

Specifically, each decoding convolutional layer respectively performs feature reconstruction on input data of the each decoding convolutional layer to obtain a corresponding decoding feature. Since the resolutions of pieces of input data corresponding to different decoding convolutional layers are different, accordingly, the resolutions of the obtained decoding features are also different, and the pieces of semantic information carried by the decoding features are also different. For each decoding convolutional layer, the decoding convolutional layer adjusts the decoding features outputted by other decoding convolutional layers to obtain an adjustment result, so that the adjustment result is consistent with the resolution of the decoding feature outputted by the decoding convolutional layer, which lays a foundation for the smooth execution of feature fusion, where the decoding convolutional layer and the other decoding convolutional layers belong to a same overlapping decoding sub-network. Accordingly, feature fusion is performed on the adjustment result and the decoding feature outputted by the decoding convolutional layer so that the output data of the overlapping decoding sub-network can carry pieces of semantic information of different dimensions, thereby improving the semantic richness and comprehensiveness of the output data of the overlapping decoding sub-network.

For a non-tail overlapping decoding sub-network, output data of the non-tail overlapping decoding sub-network is used as reference data for input data of a next overlapping decoding sub-network to determine the input data of the next overlapping decoding sub-network. For the tail overlapping decoding sub-network, output data of the tail overlapping decoding sub-network is used for determining the target image and classifying pixel points to achieve the purpose of dense prediction.

It is to be noted that the number of decoding convolutional layers in the non-tail overlapping decoding sub-network is at least two. In addition, in the field of deep learning, convolution processing is usually used to implement the operation of feature reconstruction and feature fusion. Therefore, each decoding convolutional layer includes at least one convolution unit for implementing feature reconstruction function and at least one convolution unit for implementing feature fusion.

In order to simplify the network structure of the decoding network and thus reduce the network complexity, in an optional embodiment, the number of decoding convolutional layers in the non-tail overlapping decoding sub-network may be set to two, and the number of convolution units contained in each decoding convolutional layer is two.

Figure 6:
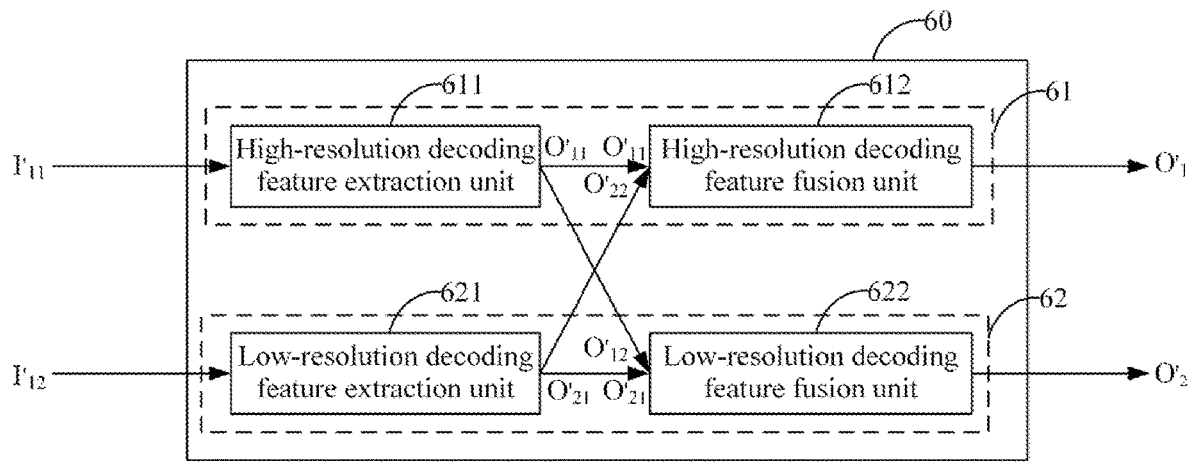
FIG. 6 is a structure diagram of another overlapping decoding sub-network according to an embodiment of the present application.

Further, with reference to FIG. 6 which shows a structure diagram of a non-tail overlapping decoding sub-network, the overlapping decoding sub-network 60 includes a high-resolution decoding convolutional layer 61 and a low-resolution decoding convolutional layer 62; where the high-resolution decoding convolutional layer 61 includes a high-resolution decoding feature reconstruction unit 611 and a high-resolution decoding feature fusion unit 612, and the low-resolution decoding convolutional layer 62 includes a low-resolution decoding feature reconstruction unit 621 and a low-resolution decoding feature fusion unit 622.

The high-resolution decoding feature reconstruction unit 611 performs feature reconstruction on input data $I'_{11}$ of the high-resolution decoding feature reconstruction unit 611 to obtain a high-resolution decoding feature $O'_{11}$. The low-resolution decoding feature reconstruction unit 621 performs feature reconstruction on input data $I'_{12}$ of the low-resolution decoding feature reconstruction unit 621 to obtain a low-resolution decoding feature $O'_{21}$. The high-resolution decoding feature fusion unit 612 performs feature fusion on the high-resolution decoding feature $O'_{11}$ and an upsampling result $O'_{22}$ corresponding to the low-resolution decoding feature $O'_{21}$ to obtain output data $O'_1$ of the high-resolution decoding feature fusion unit 612, where the upsampling result $O'_{22}$ has the same resolution as the high-resolution decoding feature $O'_{11}$. The low-resolution decoding feature fusion unit 622 performs feature fusion on the low-resolution decoding feature $O'_{21}$ and a downsampling result $O'_{12}$ corresponding to the high-resolution decoding feature $O'_{11}$ to obtain output data $O'_2$ of the low-resolution decoding feature fusion unit 622, where the downsampling result $O'_{12}$ has the same resolution as the low-resolution decoding feature $O'_{21}$.

The resolutions of the output data $O'_1$ and the output data $O'_2$ are different from each other. Specifically, the resolution of the output data $O'_1$ is higher than the resolution of the output data $O'_2$.

For example, the downsampling process may be implemented by means of max pooling, average pooling or stride convolution, which is not limited in the present application. Because of the information loss in the downsampling process, the stride convolution is typically used to reduce the information loss through learning.

For example, the upsampling process may be implemented by means of transposed convolution or interpolation to implement channel dimension consistency. The interpolation may be bilinear interpolation or other interpolation methods in the related art, which is not limited in the present application.

For example, the feature fusion may be implemented be means of pixel point superimposition, and of course, the feature fusion may be implemented in other methods in the related art as needed, which is not limited in the present application.

If the overlapping decoding sub-network 60 is followed by a next overlapping decoding sub-network, upsampling may be directly performed on the output data $O'_1$ and the output data $O'_2$ respectively to obtain data of at least two different resolutions as input data of the next overlapping decoding sub-network; or optionally, upsampling may be performed on the output data $O'_2$ to obtain at least two upsampling results, and data of at least two different resolutions in the upsampling results and the output data $O'_2$ may be used as input data of the next overlapping decoding sub-network; or optionally, upsampling may be performed on the output data $O'_1$ to obtain at least two upsampling results, and data of at least two different resolutions in the upsampling results may be used as input data of the next overlapping decoding sub-network.

If the next overlapping decoding sub-network of the overlapping decoding sub-network 60 is the tail overlapping decoding sub-network, tail input data may be generated directly according to at least one of the output data $O'_1$ and the output data $O'_2$, and feature extraction is performed on the tail input data according to the tail overlapping decoding sub-network to obtain the target image feature. The resolutions of the tail input data and the to-be-processed data are different from each other.

In a specific implementation, the tail input data is generated according to at least one of the output data $O'_1$ and the output data $O'_2$ by using at least one of the following manners: the output data $O'_1$ is directly used as the tail input data, the output data $O'_2$ is directly used as the tail input data, the fusion feature of the output data $O'_1$ and the output data $O'_2$ is used as the tail input data, or the upsampling result of the output data $O'_1$ or the upsampling result of the output data $O'_2$ is used as the tail input data.

It is to be understood that the specific structure of the non-tail overlapping decoding subnetwork is refined into a high-resolution decoding feature extraction unit, a high-resolution decoding feature fusion unit, a low-resolution decoding feature extraction unit, and a low-resolution decoding feature fusion unit. Each of the units performs its own functions to implement feature reconstruction and feature fusion, thereby further improving the decoding mechanism of the decoding network. Meanwhile, only two decoding convolutional layers are arranged in the embodiment of the present application, that is, the high-resolution decoding convolutional layer and the low-resolution decoding convolutional layer, thereby reducing the network complexity of the decoding network and improving the decoding efficiency.

Figure 7:
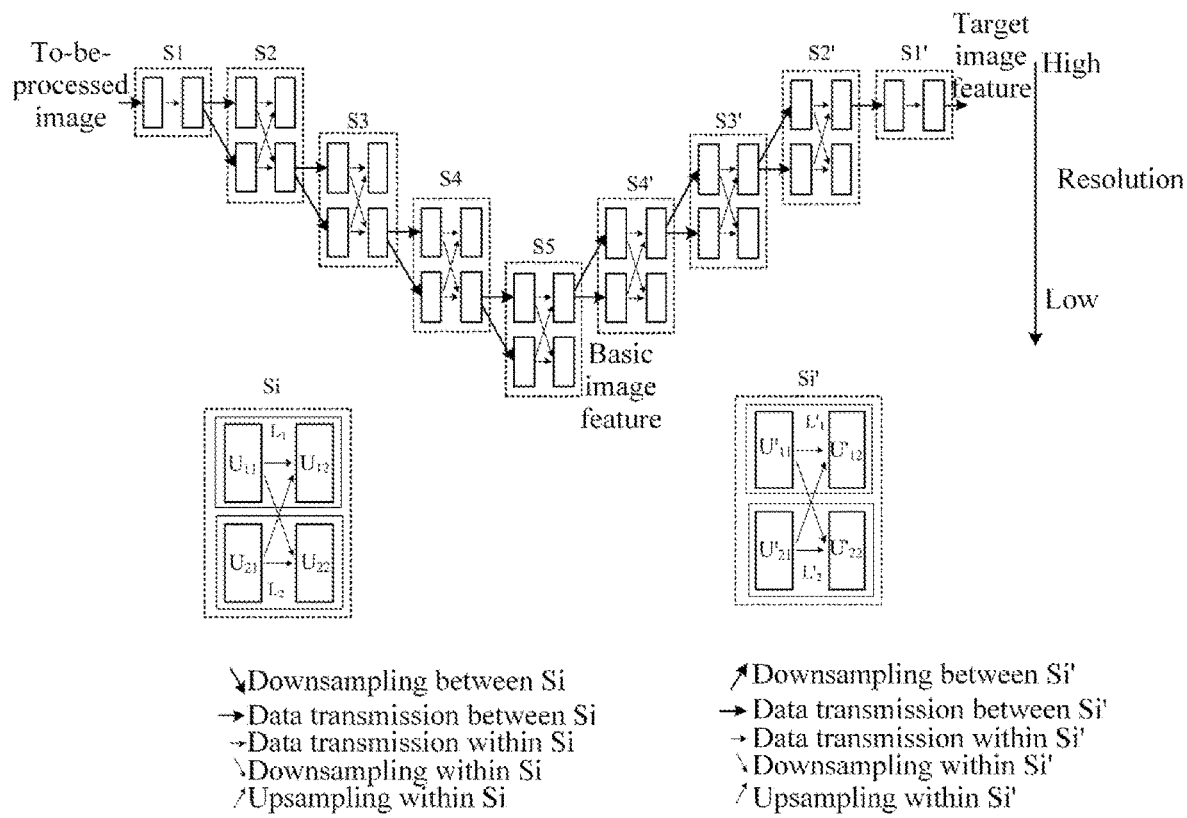
FIG. 7 is a structure diagram of another feature extraction network according to an embodiment of the present application.

On the basis of the preceding technical solutions, the present application further provides a preferred embodiment of the feature extraction network. With reference to FIG. 7, the feature extraction network includes an encoding network and a decoding network.

For example, the encoding network includes five overlapping encoding sub-networks (Si, where i=1-5). The number of overlapping encoding sub-networks may be determined by technicians according to requirements or empirical values or repeatedly determined by performing a large number of trials.

For example, the head overlapping encoding sub-network S1 performs feature extraction on the to-be-processed image to generate output data of the head overlapping encoding sub-network S1; and each of non-head overlapping encoding sub-networks (Si, where i=2-5) is provided with a high-resolution encoding convolutional layer $L_1$ and a low-resolution encoding convolutional layer $L_2$, where the high-resolution encoding convolutional layer $L_1$ includes a high-resolution encoding feature extraction unit $U_{11}$ and a high-resolution encoding feature fusion unit $U_{12}$, and the low-resolution encoding convolutional layer $L_2$ includes a low-resolution encoding feature extraction unit $U_{21}$ and a low-resolution encoding feature fusion unit $U_{22}$.

For example, the high-resolution encoding feature extraction unit $U_{11}$ performs feature extraction on low-resolution output data (which is the output data of the low-resolution encoding feature fusion unit $U_{22}$ of the previous overlapping encoding sub-network) of a previous overlapping encoding sub-network to obtain a high-resolution encoding feature; the low-resolution encoding feature extraction unit $U_{21}$ performs feature extraction on a downsampling result of the low-resolution output data of the previous overlapping encoding sub-network to obtain a low-resolution encoding feature; the high-resolution encoding feature fusion unit $U_{12}$ performs feature fusion on the upsampling result (the resolution of which is the same as the resolution of the high-resolution encoding feature) of the low-resolution encoding feature and the high-resolution encoding feature to obtain output data of the high-resolution encoding feature fusion unit $U_{12}$; and the low-resolution encoding feature fusion unit $U_{22}$ performs feature fusion on the downsampling result (the resolution of which is the same as the resolution of the low-resolution encoding feature) of the high-resolution encoding feature and the low-resolution encoding feature to obtain output data of the low-resolution encoding feature fusion unit $U_{22}$.

For example, the output data of the high-resolution encoding feature fusion unit $U_{12}$ of the tail overlapping encoding sub-network is used as the basic image feature, which carries low-frequency information of the to-be-processed image, such as context information.

In an optional embodiment, the head overlapping encoding sub-network may be implemented by setting a high-resolution encoding convolutional layer $L_1$ or setting a low-resolution encoding convolutional layer $L_2$, and the head overlapping encoding sub-network is only used for performing feature extraction on the to-be-processed image.

For example, the decoding network includes four overlapping decoding sub-networks (Si', where i=1-4). The number of overlapping decoding sub-networks may be determined by technicians according to requirements or empirical values or adjusted according to the number of overlapping encoding sub-networks. In order to simplify the network structure, the number of overlapping decoding sub-networks is set to be one less than the number of overlapping encoding sub-networks in the embodiment of the present application.

For example, each of the non-tail overlapping decoding sub-networks (Si', i=2-4) includes a high-resolution decoding convolutional layer $L'_1$ and a low-resolution decoding convolutional layer $L'_2$, where the high-resolution decoding convolutional layer $L'_1$ includes a high-resolution decoding feature reconstruction unit $U'_{11}$ and a high-resolution decoding feature fusion unit $U'_{12}$, and the low-resolution decoding convolutional layer $L'_2$ includes a low-resolution decoding feature reconstruction unit $U'_{21}$ and a low-resolution decoding feature fusion unit $U'_{22}$.

For example, for the head overlapping decoding sub-network S4', the high-resolution decoding feature reconstruction unit $U'_{11}$ performs feature reconstruction on the upsampling result (the resolution of which is the same as the resolution of the low-resolution encoding feature extraction unit $U_{21}$ of S5) of the basic image feature of a previous overlapping encoding sub-network S5 to obtain the high-resolution decoding feature; the low-resolution decoding feature reconstruction unit $U'_{21}$ performs feature reconstruction on the basic image feature of the previous overlapping encoding sub-network S5 to obtain a low-resolution decoding feature; the high-resolution decoding feature fusion unit $U'_{12}$ performs feature fusion on the upsampling result (the resolution of which is the same as the resolution of the high-resolution decoding feature) of the low-resolution decoding feature and the high-resolution decoding feature to obtain output data of the high-resolution decoding feature fusion unit $U'_{12}$; and the low-resolution decoding feature fusion unit $U'_{22}$ performs feature fusion on the downsampling result (the resolution of which is the same as the resolution of the low-resolution decoding feature) of the high-resolution decoding feature and the low-resolution decoding feature to obtain output data of the low-resolution decoding feature fusion unit $U'_{22}$.

For example, for an overlapping decoding sub-network (Si', where i=2-3) which is not at the head or the tail, the high-resolution decoding feature reconstruction unit $U'_{11}$ performs feature reconstruction on the upsampling result (the resolution of which is the same as the resolution of the low-resolution encoding feature extraction unit $U_{21}$ in the corresponding overlapping encoding sub-network Si) of the high-resolution output data (which is the output data of the high-resolution decoding feature fusion unit $U'_{12}$ of the previous overlapping decoding sub-network) of the previous overlapping decoding sub-network to obtain a high-resolution decoding feature; the low-resolution decoding feature reconstruction unit $U'_{21}$ performs feature reconstruction on the high-resolution output data of the previous overlapping decoding sub-network to obtain a low-resolution decoding feature; the high-resolution decoding feature fusion unit $U'_{12}$ performs feature fusion on the upsampling result (the resolution of which is the same as the resolution of the high-resolution decoding feature) of the low-resolution decoding feature and the high-resolution decoding feature to obtain output data of the high-resolution decoding feature fusion unit $U'_{12}$; and the low-resolution decoding feature fusion unit $U'_{22}$ performs feature fusion on the downsampling result (the resolution of which is the same as the resolution of the low-resolution decoding feature) of the high-resolution decoding feature and the low-resolution decoding feature to obtain output data of the low-resolution decoding feature fusion unit $U'_{22}$.

For example, the tail overlapping decoding sub-network S1' directly performs feature extraction on the output data of the high-resolution decoding feature fusion unit $U'_{12}$ in the previous overlapping decoding sub-network S2' to obtain the target image feature.

In an optional embodiment, the tail overlapping decoding sub-network may be implemented by setting a high-resolution decoding convolutional layer $L'_1$ or setting a low-resolution decoding convolutional layer $L'_2$, and the head overlapping decoding sub-network is only used for performing feature extraction on the input data of the tail overlapping decoding sub-network.

It is to be noted that the resolutions of the image features in the same row in FIG. 7 are the same, and the image resolutions gradually decrease with the increase of convolution depth.

Figure 8:
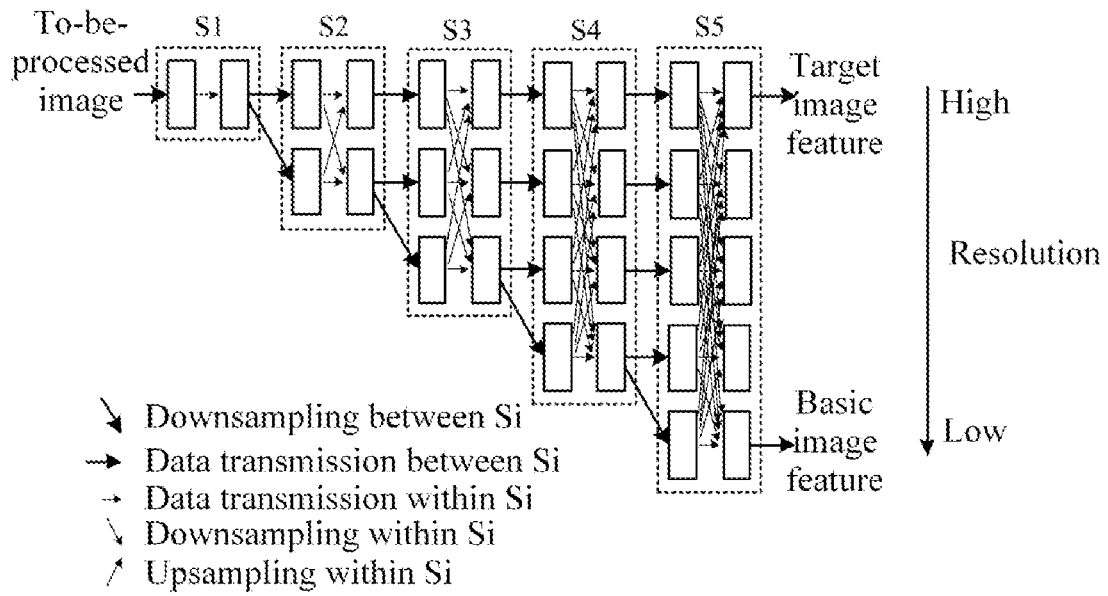
FIG. 8 is a structure diagram of a feature extraction network in the related art.

FIG. 8 shows an HRNet feature extraction network in the related art. Such a network is provided with S1-S5 stage networks corresponding to FIG. 7, where the encoding process and the decoupling process are coupled together in each stage network. Since the final extracted target image feature is only fused with the output feature having the highest resolution, the inference is performed only once in the generation process of the target image feature, which makes the semantic information carried by the target image feature relatively simple and affects the accuracy of dense prediction results. It is to be noted that the resolutions of the image features in the same row are the same, and the image resolution gradually decreases with the increase of convolution depth.

Compared with the HRNet feature extraction network in the related art shown in FIG. 8, the image feature extraction network used in the present application can implement the decoupling of the encoding process and the decoding process, reduce high-resolution processing units (such as feature extraction units, feature fusion units, and feature reconstruction units near the top) by increasing low-resolution processing units (such as feature extraction units, feature fusion units, and feature reconstruction units near the bottom), and in addition, enrich the semantic information carried in the target image feature by increasing the number of inferences (4 inferences between S5 and S1' in total while only one inference in the related art) in the decoding process, thereby improving the semantic expression ability of the target image feature and further laying a foundation for the improvement of the accuracy of dense prediction results.

As the implementation of the preceding image processing methods, the present application further provides an optional embodiment of a virtual apparatus for implementing the image processing methods.

Figure 9:
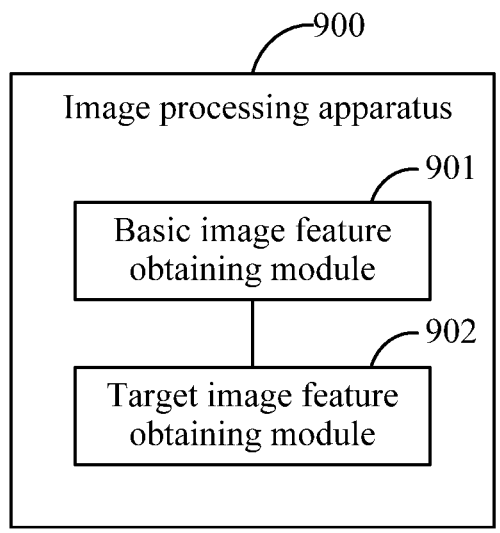
FIG. 9 is a structure diagram of an image processing apparatus according to an embodiment of the present application.

Further, with reference to FIG. 9, an image processing apparatus 900 includes a basic image feature obtaining module 901 and a target image feature obtaining module 902.

The basic image feature obtaining module 901 is configured to input a to-be-processed image into an encoding network to obtain a basic image feature, where the encoding network includes at least two cascaded overlapping encoding sub-networks, each overlapping encoding sub-network performs encoding and fusion processing on input data of the each overlapping encoding sub-network at at least two resolutions.

The target image feature obtaining module 902 is configured to input the basic image feature into a decoding network to obtain a target image feature for pixel point classification, where the decoding network includes at least one cascaded overlapping decoding sub-network, each overlapping decoding sub-network performs decoding and fusion processing on input data of the each overlapping decoding sub-network at at least two resolutions.

In the embodiment of the present application, at least one cascaded overlapping decoding sub-network is arranged in the decoding network to perform encoding and fusion processing on the basic image feature at different scales stepwise. The number of overlapping decoding sub-networks is set to at least one so that the inference times in the generation process of the target image feature increase. In this way, on the basis of the basic image feature, local detail features are superposed at different scales, which causes the semantic information carried by the final generated target image feature to be rich and comprehensive, thereby improving the semantic expression ability of the target image features and laying a foundation for the improvement of the accuracy of pixel point classification results, that is, improving the accuracy of dense prediction results.

In an optional embodiment, input data of a head overlapping encoding sub-network in the encoding network is the to-be-processed image.

Input data of each of the non-head overlapping encoding sub-networks in the encoding network is determined according to output data of a previous overlapping encoding sub-network of each of the non-head overlapping encoding sub-networks, and the resolutions of the pieces of input data sequentially decrease.

In an optional embodiment, each of the non-head overlapping encoding sub-networks in the encoding network includes at least two encoding convolutional layers, and the resolution of input data of the at least two encoding convolutional layers is different from each other.

In an optional embodiment, for each of the non-head overlapping encoding sub-networks in the encoding network, each of the at least two encoding convolutional layers performs feature extraction on input data of the each of the at least two encoding convolutional layers to obtain an encoding feature.

For each of the at least two encoding convolutional layers, an encoding convolutional layer adjusts encoding features outputted by other encoding convolutional layers to obtain an adjustment result and performs feature fusion on the adjustment result and the encoding feature outputted by the encoding convolutional layer to obtain output data of the encoding convolutional layer, where the encoding convolutional layer and the other encoding convolutional layers belong to a same overlapping encoding sub-network.

In an optional embodiment, each of the non-head overlapping encoding sub-networks includes a high-resolution encoding convolutional layer and a low-resolution encoding convolutional layer, where the high-resolution encoding convolutional layer includes a high-resolution encoding feature extraction unit and a high-resolution encoding feature fusion unit, and the low-resolution encoding convolutional layer includes a low-resolution encoding feature extraction unit and a low-resolution encoding feature fusion unit.

The high-resolution encoding feature extraction unit performs feature extraction on input data of the high-resolution encoding feature extraction unit to obtain a high-resolution encoding feature.

The low-resolution encoding feature extraction unit performs feature extraction on input data of the low-resolution encoding feature extraction unit to obtain a low-resolution encoding feature.

The high-resolution encoding feature fusion unit performs feature fusion on an upsampling result of the low-resolution encoding feature and the high-resolution encoding feature to obtain output data of the high-resolution encoding feature fusion unit, where the upsampling result has the same resolution as the high-resolution encoding feature.

The low-resolution encoding feature fusion unit performs feature fusion on a downsampling result of the high-resolution encoding feature and the low-resolution encoding feature to obtain output data of the low-resolution encoding feature fusion unit, where the downsampling result has the same resolution as the low-resolution encoding feature.

In an optional embodiment, input data of a head overlapping decoding sub-network in the decoding network is determined according to output data of a tail overlapping encoding sub-network in the encoding network.

Input data of each of the non-head overlapping decoding sub-networks in the decoding network is determined according to output data of a previous overlappin decoding g sub-network of each of the non-head overlapping decoding sub-networks, and the resolutions of the pieces of input data sequentially increase.

In an optional embodiment, each of the non-head overlapping decoding sub-networks in the decoding network includes at least two decoding convolutional layers, and the resolutions of pieces of input data of the at least two decoding convolutional layers are different from each other.

In an optional embodiment, for each of the non-tail overlapping decoding sub-networks in the decoding network, each of the at least two decoding convolutional layers performs feature reconstruction on input data of the each of the at least two decoding convolutional layers to obtain a decoding feature.

For each of the at least two decoding convolutional layers, a decoding convolutional layer adjusts decoding features outputted by other decoding convolutional layers to obtain an adjustment result and performs feature fusion on an adjustment result and a decoding feature outputted by the decoding convolutional layer to obtain output data of the decoding convolutional layer, where the decoding convolutional layer and the other decoding convolutional layers belong to a same overlapping decoding sub-network.

In an optional embodiment, each of the non-tail overlapping decoding sub-networks includes a high-resolution decoding convolutional layer and a low-resolution decoding convolutional layer, where the high-resolution decoding convolutional layer includes a high-resolution decoding feature reconstruction unit and a high-resolution decoding feature fusion unit, and the low-resolution decoding convolutional layer includes a low-resolution decoding feature reconstruction unit and a low-resolution decoding feature fusion unit.

The high-resolution decoding feature reconstruction unit performs feature reconstruction on input data of the high-resolution decoding feature reconstruction unit to obtain a high-resolution decoding feature.

The low-resolution decoding feature reconstruction unit performs feature reconstruction on input data of the low-resolution decoding feature reconstruction unit to obtain a low-resolution decoding feature.

The high-resolution decoding feature fusion unit performs feature fusion on an upsampling result of the low-resolution decoding feature and the high-resolution decoding feature to obtain output data of the high-resolution decoding feature fusion unit, where the upsampling result has the same resolution as the high-resolution decoding feature.

The low-resolution decoding feature fusion unit performs feature fusion on a downsampling result of the high-resolution decoding feature and the low-resolution decoding feature to obtain output data of the low-resolution decoding feature fusion unit, where the downsampling result has the same resolution as the low-resolution decoding feature.

The preceding image processing apparatus may execute the image processing method provided by any of the embodiments of the present application and has functional modules and beneficial effects corresponding to the execution of the image processing method.

According to an embodiment of the present application, the present application further provides an electronic device, a readable storage medium, and a computer program product.

Figure 10:
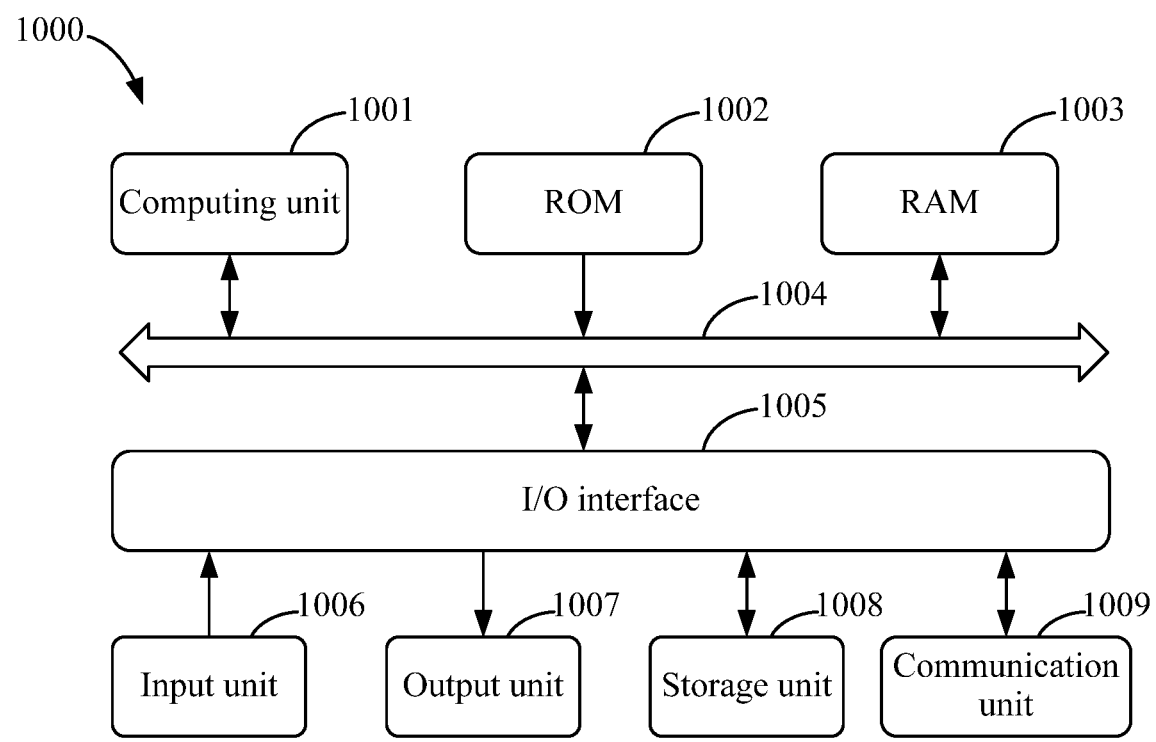
FIG. 10 is a block diagram of an electronic device for implementing an image processing method according to an embodiment of the present application.

FIG. 10 is an illustrative block diagram of an exemplary electronic device 1000 that may be used for implementing the embodiments of the present application. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present application as described and/or claimed herein.

As shown in FIG. 10, the device 1000 includes a computing unit 1001. The computing unit 1001 may execute various types of appropriate actions and processing according to a computer program stored in a read-only memory (ROM) 1002 or a computer program loaded from a storage unit 1008 to a random access memory (RAM) 1003. Various programs and data required for operations of the device 1000 may also be stored in the RAM 1003. The computing unit 1001, the ROM 1002, and the RAM 1003 are connected to each other through a bus 1004. An input/output (I/O) interface 1005 is also connected to the bus 1004.

Multiple components in the device 1000 are connected to the I/O interface 1005. The multiple components include an input unit 1006 such as a keyboard and a mouse, an output unit 1007 such as various types of displays and speakers, the storage unit 1008 such as a magnetic disk and an optical disk, and a communication unit 1009 such as a network card, a modem and a wireless communication transceiver. The communication unit 1009 allows the device 1000 to exchange information/data with other devices over a computer network such as the Internet and/or various telecommunications networks.

The computing unit 1001 may be various general-purpose and/or special-purpose processing components having processing and computing capabilities. Some examples of the computing unit 1001 include, but are not limited to, central processing units (CPUs), graphics processing units (GPUs), various special-purpose artificial intelligence (AI) computing chips, various computing units running machine learning models and algorithms, digital signal processors (DSPs), and any appropriate processors, controllers and microcontrollers. The computing unit 1001 performs various methods and processing described above, such as the image processing method. For example, in some embodiments, the image processing method may be implemented as a computer software program tangibly contained in a machine-readable medium such as the storage unit 1008. In some embodiments, part or all of a computer program can be loaded and/or installed on the device 1002 via the ROM 1000 and/or the communication unit 1009. When the computer program is loaded to the RAM 1003 and executed by the computing unit 1001, one or more steps of the preceding image processing method may be performed. Alternatively, in other embodiments, the computing unit 1001 may be configured, in any other suitable manner (for example, by means of firmware), to perform the image processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on a chip (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting data and instructions to the memory system, the at least one input device and the at least one output device.

Program codes for implementing the methods of the present application can be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present application, the machine-readable medium may be a tangible medium that can include or store a program that is used by or used in conjunction with a system, apparatus or device that executes instructions. The machine-readable medium may be a machine-readable signal medium or a machine-readable storage medium. The machine-readable medium may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or an LCD monitor) for displaying information to the user and a keyboard and a pointing device (for example, a mouse or a trackball) through which the user can provide input to the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service. The server may also be a server of a distributed system or a server combined with blockchain.

Artificial intelligence is a discipline that studies making computers simulate some thinking processes and intelligent behaviors (such as learning, reasoning, thinking, planning, and the like) of humans, and has both hardware-level technologies and software-level technologies. The artificial intelligence hardware technologies generally include technologies such as sensors, special artificial intelligence chips, cloud computing, distributed storage, big data processing, and the like. The artificial intelligence software technologies mainly include computer vision technology, speech recognition technology, natural language processing technology, machine learning/deep learning technology, big data processing technology, knowledge map technology, and the like.

The cloud computing refers to a technical system that accesses flexible and scalable shared physical or virtual resource pools through the network, in which resources can include servers, operating systems, networks, software, applications, and storage devices, and deploys and manages resources on demand and in a self-service manner. Cloud computing technology can provide efficient and powerful data processing capabilities for artificial intelligence, blockchain, and other technology applications and model training.

It is to be understood that various forms of the preceding flows may be used, with steps reordered, added or removed. For example, the steps described in the present application may be executed in parallel, in sequence or in a different order as long as the desired results of the technical solutions disclosed in the present application are achieved. The execution sequence of these steps is not limited herein.

The scope of the present application is not limited to the preceding embodiments. It is to be understood by those skilled in the art that various modifications, combinations, subcombinations, and substitutions may be made depending on design requirements and other factors. Any modification, equivalent substitution, improvement and the like made within the spirit and principle of the present application is within the scope of the present application.

What is claimed is:

1. An image processing method, comprising:
    inputting a to-be-processed image into an encoding network to obtain a basic image feature, wherein the encoding network comprises at least two cascaded overlapping encoding sub-networks, wherein each of non-head overlapping encoding sub-networks of the at least two overlapping encoding sub-networks performs encoding and fusion processing on input data of the each of non-head overlapping encoding sub-networks at at least two resolutions; and
    inputting the basic image feature into a decoding network to obtain a target image feature for pixel point classification, wherein the decoding network comprises at least one cascaded overlapping decoding sub-network, wherein each overlapping decoding sub-network of the at least one cascaded overlapping decoding sub-network performs decoding and fusion processing on input data of the each overlapping decoding sub-network at at least two resolutions.

2. The method according to claim 1, wherein input data of a head overlapping encoding sub-network in the encoding network is the to-be-processed image; and
    input data of the each of non-head overlapping encoding sub-networks in the encoding network is determined according to output data of a previous overlapping encoding sub-network of the each of the non-head overlapping encoding sub-networks, and resolutions of pieces of input data of the non-head overlapping encoding sub-networks sequentially decrease.

3. The method according to claim 2, wherein the each of the non-head overlapping encoding sub-networks in the encoding network comprises at least two encoding convolutional layers, and resolutions of pieces of input data of the at least two encoding convolutional layers are different from each other.

4. The method according to claim 3, wherein for each of the at least two encoding convolutional layers of the each of the non-head overlapping encoding sub-networks in the encoding network, performing, by an encoding convolutional layer, feature extraction on input data of the encoding convolutional layer to obtain an encoding feature;

adjusting, by the encoding convolutional layer, encoding features outputted by other encoding convolutional layers to obtain a first adjustment result, wherein the encoding convolutional layer and the other encoding convolutional layers belong to a same overlapping encoding sub-network; and performing, by the encoding convolutional layer, feature fusion on the first adjustment result and the encoding feature to obtain output data of the encoding convolutional layer.

5. The method according to claim 4, wherein the each of the non-head overlapping encoding sub-networks comprises a high-resolution encoding convolutional layer and a low-resolution encoding convolutional layer; wherein the high-resolution encoding convolutional layer comprises a high-resolution encoding feature extraction unit and a high-resolution encoding feature fusion unit; and the low-resolution encoding convolutional layer comprises a low-resolution encoding feature extraction unit and a low-resolution encoding feature fusion unit;

the high-resolution encoding feature extraction unit performs feature extraction on input data of the high-resolution encoding feature extraction unit to obtain a high-resolution encoding feature;

the low-resolution encoding feature extraction unit performs feature extraction on input data of the low-resolution encoding feature extraction unit to obtain a low-resolution encoding feature;

the high-resolution encoding feature fusion unit performs feature fusion on an upsampling result of the low-resolution encoding feature and the high-resolution encoding feature to obtain output data of the high-resolution encoding feature fusion unit, wherein the upsampling result has a same resolution as the high-resolution encoding feature; and the low-resolution encoding feature fusion unit performs feature fusion on a downsampling result of the high-resolution encoding feature and the low-resolution encoding feature to obtain output data of the low-resolution encoding feature fusion unit, wherein the downsampling result has a same resolution as the low-resolution encoding feature.

6. The method according to claim 1, wherein input data of a head overlapping decoding sub-network in the decoding network is determined according to output data of a tail overlapping encoding sub-network in the encoding network; and
    input data of each of non-head overlapping decoding sub-networks in the decoding network is determined according to output data of a previous overlapping decoding sub-network of each of the non-head overlapping decoding sub-networks, and resolutions of pieces of input data of the non-head overlapping decoding sub-networks sequentially increase.

7. The method according to claim 6, wherein the each of non-tail overlapping decoding sub-networks in the decoding network comprises at least two decoding convolutional layers, and resolutions of pieces of input data of the at least two decoding convolutional layers are different from each other.

8. The method according to claim 7, wherein for each of the at least two decoding convolutional layers of the each of the non-tail overlapping decoding sub-networks in the decoding network, performing, by an decoding convolutional layer, feature reconstruction on input data of the decoding convolutional layer to obtain a decoding feature; and adjusting, by the decoding convolutional layer, decoding features outputted by other decoding convolutional layers to obtain a second adjustment result, wherein the decoding convolutional layer and the other decoding convolutional layers belong to a same overlapping decoding sub-network; and performing, by the decoding convolutional layer, feature fusion on the second adjustment result and the decoding feature to obtain output data of the decoding convolutional layer.

9. The method according to claim 8, wherein the each of the non-tail overlapping decoding sub-networks comprises a high-resolution decoding convolutional layer and a low-resolution decoding convolutional layer; wherein the high-resolution decoding convolutional layer comprises a high-resolution decoding feature reconstruction unit and a high-resolution decoding feature fusion unit; and the low-resolution decoding convolutional layer comprises a low-resolution decoding feature reconstruction unit and a low-resolution decoding feature fusion unit;

the high-resolution decoding feature reconstruction unit performs feature reconstruction on input data of the high-resolution decoding feature reconstruction unit to obtain a high-resolution decoding feature;

the low-resolution decoding feature reconstruction unit performs feature reconstruction on input data of the low-resolution decoding feature reconstruction unit to obtain a low-resolution decoding feature;

the high-resolution decoding feature fusion unit performs feature fusion on an upsampling result of the low-resolution decoding feature and the high-resolution decoding feature to obtain output data of the high-resolution decoding feature fusion unit, wherein the upsampling result has a same resolution as the high-resolution decoding feature; and the low-resolution decoding feature fusion unit performs feature fusion on a downsampling result of the high-resolution decoding feature and the low-resolution decoding feature to obtain output data of the low-resolution decoding feature fusion unit, wherein the downsampling result has a same resolution as the low-resolution decoding feature.

10. A non-transitory computer-readable storage medium having computer instructions stored thereon, wherein the computer instructions are configured to cause a computer to perform the image processing method according to claim 1.

11. An image processing apparatus, comprising a processor and a memory for storing execution instructions that when executed by the processor cause the processor to perform steps in following modules:

a basic image feature obtaining module, which is configured to input a to-be-processed image into an encoding network to obtain a basic image feature, wherein the encoding network comprises at least two cascaded overlapping encoding sub-networks, wherein each overlapping encoding sub-network of the at least two overlapping encoding sub-networks performs encoding and fusion processing on input data of the each overlapping encoding sub-network at at least two resolutions; and a target image feature obtaining module, which is configured to input the basic image feature into a decoding network to obtain a target image feature for pixel point classification, wherein the decoding network comprises at least one cascaded overlapping decoding sub-network, wherein each overlapping decoding sub-network of the at least one cascaded overlapping decoding sub-network performs decoding and fusion processing on input data of the each overlapping decoding sub-network at at least two resolutions.

12. The apparatus according to claim 11, wherein input data of a head overlapping encoding sub-network in the encoding network is the to-be-processed image; and input data of each of non-head overlapping encoding sub-networks in the encoding network is determined according to output data of a previous overlapping encoding sub-network of the each of the non-head overlapping encoding sub-networks, and resolutions of pieces of input data of the non-head overlapping encoding sub-networks sequentially decrease.

13. The apparatus according to claim 12, wherein the each of the non-head overlapping encoding sub-networks in the encoding network comprises at least two encoding convolutional layers, and resolutions of pieces of input data of the at least two encoding convolutional layers are different from each other.

14. The apparatus according to claim 13, wherein for each of the at least two encoding convolutional layers of the each of the non-head overlapping encoding sub-networks in the encoding network, an encoding convolutional layer performs feature extraction on input data of the encoding convolutional layer to obtain an encoding feature;

the encoding convolutional layer adjusts encoding features outputted by other encoding convolutional layers to obtain a first adjustment result, wherein the encoding convolutional layer and the other encoding convolutional layers belong to a same overlapping encoding sub-network; and the encoding convolutional layer performs feature fusion on the first adjustment result and the encoding feature to obtain output data of the encoding convolutional layer.

15. The apparatus according to claim 14, wherein the each of the non-head overlapping encoding sub-networks comprises a high-resolution encoding convolutional layer and a low-resolution encoding convolutional layer; wherein the high-resolution encoding convolutional layer comprises a high-resolution encoding feature extraction unit and a high-resolution encoding feature fusion unit; and the low-resolution encoding convolutional layer comprises a low-resolution encoding feature extraction unit and a low-resolution encoding feature fusion unit;

the high-resolution encoding feature extraction unit performs feature extraction on input data of the high-resolution encoding feature extraction unit to obtain a high-resolution encoding feature;

the low-resolution encoding feature extraction unit performs feature extraction on input data of the low-resolution encoding feature extraction unit to obtain a low-resolution encoding feature;

the high-resolution encoding feature fusion unit performs feature fusion on an upsampling result of the low-resolution encoding feature and the high-resolution encoding feature to obtain output data of the high-resolution encoding feature fusion unit, wherein the upsampling result has a same resolution as the high-resolution encoding feature; and the low-resolution encoding feature fusion unit performs feature fusion on a downsampling result of the high-resolution encoding feature and the low-resolution encoding feature to obtain output data of the low-resolution encoding feature fusion unit, wherein the downsampling result has a same resolution as the low-resolution encoding feature.

16. The apparatus according to claim 11, wherein input data of a head overlapping decoding sub-network in the decoding network is determined according to output data of a tail overlapping encoding sub-network in the encoding network; and input data of each of non-head overlapping decoding sub-networks in the decoding network is determined according to output data of a previous overlapping decoding sub-network of each of the non-head overlapping decoding sub-networks, and resolutions of pieces of input data of the non-head overlapping decoding sub-networks sequentially increase.

17. The apparatus according to claim 16, wherein each of non-tail overlapping decoding sub-networks in the decoding network comprises at least two decoding convolutional layers, and resolutions of pieces of input data of the at least two decoding convolutional layers are different from each other.

18. The apparatus according to claim 17, wherein for each of the at least two decoding convolutional layers of the each of the non-tail overlapping decoding sub-networks in the decoding network, an decoding convolutional layer performs feature reconstruction on input data of the decoding convolutional layer to obtain a decoding feature; and the decoding convolutional layer adjusts decoding features outputted by other decoding convolutional layers to obtain a second adjustment result, wherein the decoding convolutional layer and the other decoding convolutional layers belong to a same overlapping decoding sub-network; and the decoding convolutional layer performs feature fusion on the second adjustment result and the decoding feature to obtain output data of the decoding convolutional layer.

19. The apparatus according to claim 18, wherein the each of the non-tail overlapping decoding sub-networks comprises a high-resolution decoding convolutional layer and a low-resolution decoding convolutional layer; wherein the high-resolution decoding convolutional layer comprises a high-resolution decoding feature reconstruction unit and a high-resolution decoding feature fusion unit; and the low-resolution decoding convolutional layer comprises a low-resolution decoding feature reconstruction unit and a low-resolution decoding feature fusion unit;

the high-resolution decoding feature reconstruction unit performs feature reconstruction on input data of the high-resolution decoding feature reconstruction unit to obtain a high-resolution decoding feature;

the low-resolution decoding feature reconstruction unit performs feature reconstruction on input data of the low-resolution decoding feature reconstruction unit to obtain a low-resolution decoding feature;

the high-resolution decoding feature fusion unit performs feature fusion on an upsampling result of the low-resolution decoding feature and the high-resolution decoding feature to obtain output data of the high-resolution decoding feature fusion unit, wherein the upsampling result has a same resolution as the high-resolution decoding feature; and the low-resolution decoding feature fusion unit performs feature fusion on a downsampling result of the high-resolution decoding feature and the low-resolution decoding feature to obtain output data of the low-resolution decoding feature fusion unit, wherein the downsampling result has a same resolution as the low-resolution decoding feature.

* * * * *